United States Patent [19]

Richter

[11] Patent Number: 5,788,202

[45] Date of Patent: Aug. 4, 1998

[54] SUPPORT DEVICE FOR SUPPORTING OBJECTS

[76] Inventor: Herbert Richter, Drosselweg 8, 75331 Engelsbrand, Germany

[21] Appl. No.: 654,122

[22] Filed: May 28, 1996

[51] Int. Cl.[6] .................................................. A44G 1/10
[52] U.S. Cl. .................. 248/316.4; 224/570; 224/929; 379/446; 379/455
[58] Field of Search .......................... 248/316.4, 316.2, 248/316.3, 316.6, 309.1, 222.13, 222.51, 222.52, 221.12, 221.11, 311.2; 224/570, 929; 379/446, 455, 426, 454, 449

[56] References Cited

U.S. PATENT DOCUMENTS

| | | | |
|---|---|---|---|
| 5,305,381 | 4/1994 | Wang et al. | 379/455 |
| 5,457,745 | 10/1995 | Wang | 379/446 |
| 5,555,302 | 9/1996 | Wang | 379/426 |
| 5,615,258 | 3/1997 | Ho | 379/449 |

*Primary Examiner*—Leslie A. Braun
*Assistant Examiner*—Gwendolyn W. Baxter
*Attorney, Agent, or Firm*—Klaus J. Bach

[57] ABSTRACT

In a support device for firmly supporting objects, particularly for supporting a telephone in a vehicle, wherein the device has clamping wall structures mounted on a base body so as to be slideable thereon, pivots are provided in engagement with the clamping wall structures for movement of the clamping wall structures in unison toward, and away from each other and a locking disc is mounted on the pivots for movement therewith and locking structures are arranged adjacent the locking disc which selectively engage the locking disc to permit movement of the clamping wall structures toward each other but not away from one another, the locking disc being releasable by disengaging a locking member. Preferably the pivots includes a pin and slotted hole arrangement for transferring linear motion from the clamping wall structures to the pivots and the locking structures are friction wedges engaging the locking disc in a stepless fashion.

19 Claims, 4 Drawing Sheets

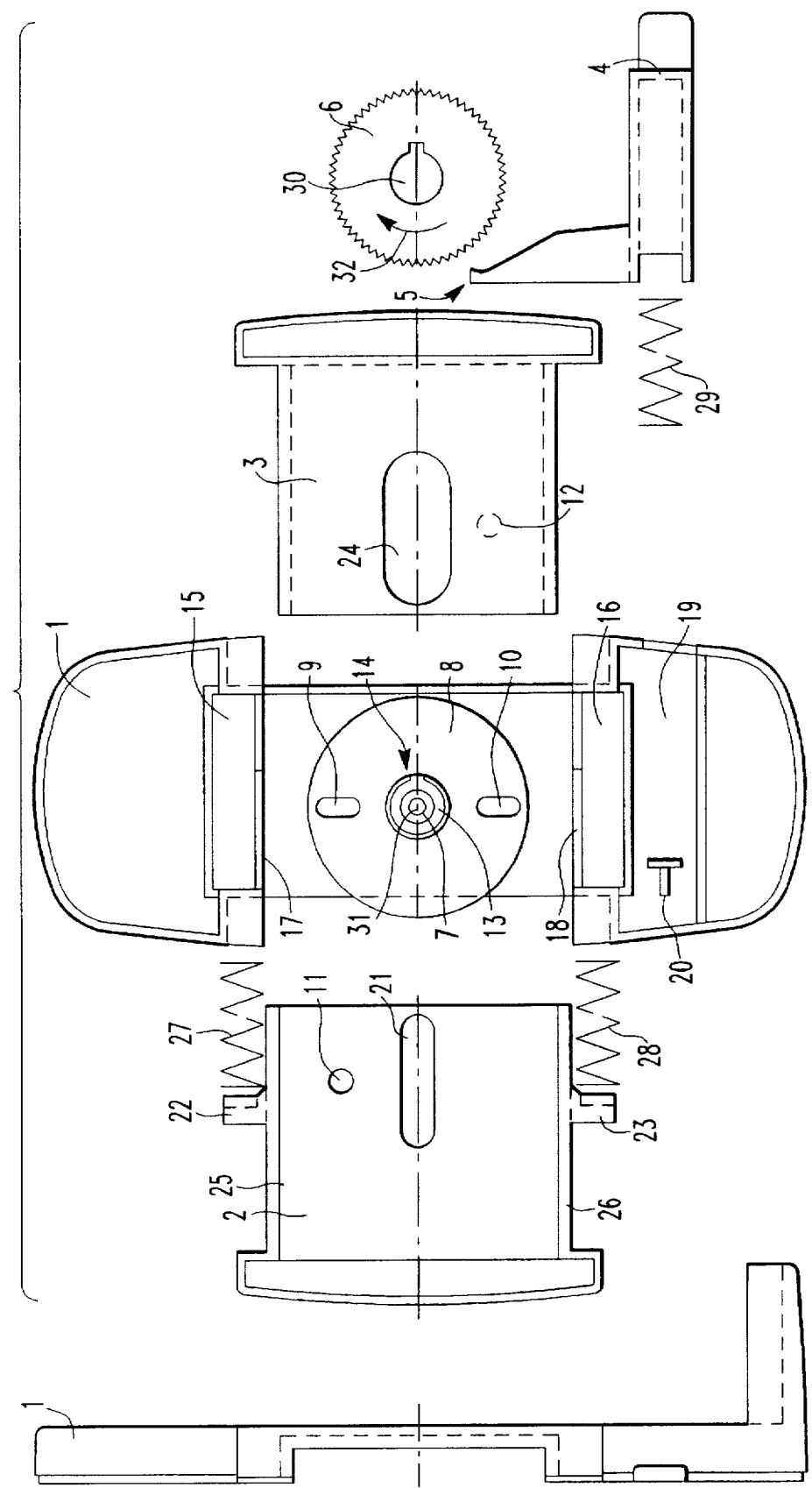

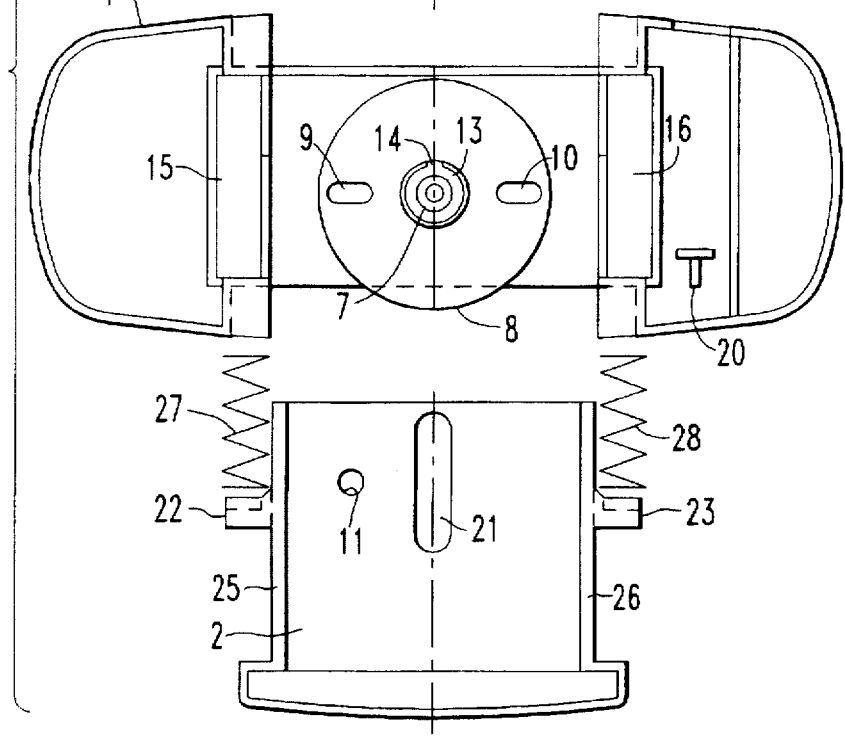

SUPPORT DEVICE FOR SUPPORTING OBJECTS

BACKGROUND OF THE INVENTION

The invention relates to a device for supporting objects in a vehicle, particularly in motor vehicle, whereby the objects, particularly mobile telephones, are temporarily retained. The device comprises a base body provided with two retaining walls of which at least one is movable from a release position toward the other against the force of a spring and can be arrested in different positions and releasing means for the disengagement of the locked retaining wall or walls to permit the return thereof to the release position.

Such devices have recently become quite popular. The first such devices had side clamping walls which were spring-biased toward one another so that an object to be retained was held between the clamping walls with a force corresponding to the spring force (see EP 0 475 091 A2). More recently support devices have become known wherein the clamping walls can be moved toward one another against the force of a spring and can be arrested in various positions. This has the advantage that, when in the release position, the clamping walls of the device are spaced furthest apart such that an object can be easily placed between the clamping walls. Then the clamping walls can be moved toward one another until they engage the object. The clamping walls are then held in such a clamping position until the releasing means is actuated.

DE 92 16 190.1 U1 discloses a supporting device for a mobile telephone which comprises a base provided with clamping walls which are movable relative to one another against the force of a spring. The clamping walls are provided with toothed rails which are arranged so as to extend in the direction of movement of the clamping walls. The toothed rails are in engagement with a gear rotatably supported therebetween which has a locking gear mounted thereon. The base further includes a slide member operable against the force of a spring for releasing the clamping walls. The slide member has a pawl which engages the locking gear when the slide member is not actuated such that the locking gear can be rotated only in one direction corresponding to the movement of the clamping walls toward one another. When the slide member is operated, the pawl is disengaged from the ratchet wheel whereby the ratchet wheel can be rotated by the spring-biased clamping walls in the opposite direction while the clamping walls are returned to their release positions.

With this arrangement, the clamping walls can be arrested in various discrete positions, but such a design is relatively involved and expensive and also relatively sensitive since the gear requires precise manufacturing and may still be subject to failures as the loss of a tooth, for example, may result in malfunctioning or total failure of the device. Furthermore, assembly of the device requires careful attention as the coordinating gear and the toothed rails must be properly positioned. In any case, the relatively small teeth of the coordinating gear and the toothed rails must be carefully placed in engagement with one another.

It is the object of the present invention to provide a device for grasping and holding objects which is easy to assemble and which operates reliably and which, in a preferred embodiment, has an infinite number of locking positions so that an object of any width within the range of movement of the engagement walls of the device can be firmly held by the holding device.

SUMMARY OF THE INVENTION

In a support device for firmly supporting objects, particularly for supporting a telephone in a vehicle, wherein the device has clamping wall structures mounted on a base body so as to be slideable thereon, pivot means are provided in engagement with the clamping wall structures for movement of the clamping wall structures in unison toward, and away from, each other and a locking disc is mounted on the pivot means for movement therewith and locking structures are arranged adjacent the locking disc which selectively engage the locking disc to permit movement of the clamping wall structures toward each other but not away from one another, the locking disc being releasable by a locking release member. Preferably the pivot means includes a pin and slotted hole arrangement for transferring linear motion from the clamping wall structures to the pivot means and the locking structures are friction means engaging the locking disc in a stepless fashion.

By the projections, which are in engagement with opposite ones of the engagement walls, the linear movement of the engagement walls is transferred to the pivot means which is rotated thereby and, at the same time, causes rotation of the locking element. Moving the clamping walls toward each other and into engagement with an object disposed therebetween will consequently result in the rotation of the locking element. When the clamping walls have been moved into engagement with the object and are released, they will remain in engagement with the object being held between the clamping walls until the release member is operated for the release of the clamping walls. If a ratchet wheel is used as the locking element, the ratchet wheel and the ratchet pawl extending from the release member are so formed that the ratchet wheel is easily movable when the engagement walls are moved toward one another but that rotation of the ratchet which in the opposite direction is prevented unless the releaese member is operated whereby the pawl is disengaged from the ratchet wheel.

Preferably, however, the locking element is provided with frictional engagement means which permit locking of he locking element at any place between the release positions of the engagement walls and their fully compressed positions.

The support device may be such that both clamping walls are movable toward, and away from, one another against the force of springs and both clamping walls are lockable in different positions. For this purpose, the pivot means is provided with a second engagement means in engagement with the second clamping wall. The transfer of the linear movement of the second clamping wall to the pivot means occurs in the same manner as the transfer of the linear movement of the first clamping wall to the rotatable element.

The engagement means for the transfer of the linear movement of the clamping walls to the pivot means comprise a pin received in a slotted hole. Preferably, the slotted holes are formed in the pivot means which may be a circular disc. The slotted holes extend radially and are disposed opposite one another with respect to the axis of rotation of the disc. The pins are then arranged at the respective portions of the clamping wall structures and are received in the respective slotted holes. However, arranging the slotted holes in the clamping wall structures and the pins on the rotatable disc is just as possible.

The pivot means, preferably a disc, has a central opening which receives a support shaft about which the pivot disc is rotatable. Around the opening, the disc is provided with a collar which includes an engagement structure, preferably a nose projecting radially from the collar. This arrangement facilitates the engagement of other structures with the pivot disc.

The locking means is preferably another disc which is seated on the collar of the pivot disc in form-locking engagement therewith so that it is rotatable in unison with the pivot disc. The locking disc may be provided at its circumference with ratchet teeth, which can be engaged by a ratchet pawl for locking the disc in a step-like manner. Preferably however, the locking disc is engageable by friction means which permit stepless locking of the locking disc in any position.

The axis of rotation of the rotatable element does not need to be arranged in the center of the base of the device. It may and preferably is, displaced from the center toward the first clamping wall. The base portion of the first clamping wall structure is then provided with a recess which receives a portion of the base portion the second clamping wall structure when the clamping wall structures are moved toward one another. The support device may be quite slim in this manner. Preferably, the clamping walls extending upwardly from the base portions of the clamping wall structures are hollow to save weight. The recess in the first clamping wall may then simply be provided by eliminating a portion of the inner wall of the clamping wall.

The clamping walls extending vertically from the base portions of the clamping wall structures may have a special geometric configuration on their opposite faces which may be particularly suitable for retaining certain objects. For example, the clamping walls may have circularly curved inner surfaces suitable for retaining cans such as beverage cans to be supported in the support device. The inside walls may be adapted in shape to any particular object to be held. Then the particular object is especially well retained in the support device according to the invention.

The support device is so shaped that it can be easily mounted. The components of the support device are easy to manufacture and are not easily damaged so that the device is quite reliable.

The invention will become more readily apparent from the following description of preferred embodiments thereof described, by way of example, with reference to the accompanying drawings.

BRIEF DESCRIPTIONS OF THE DRAWINGS

FIG. 1 is an exploded view showing the back side of the support device with the cover removed to make the operating mechanisms visible.

FIG. 2 is a side view of the base body of the device.

FIG. 6 is an exploded view of the device including the preferred locking mechanism using locking wedges, and FIGS. 7 and 8 are cross-sectional views of the locking wedges taken along line 7—7 of FIG. 6 and indicating different shapes for the engagement surfaces of the locking wedges.

FIG. 9 is a side view of the back cover of the device has been inserted.

DESCRIPTION OF THE PREFERRED EMBODIMENTS

Figure 3:
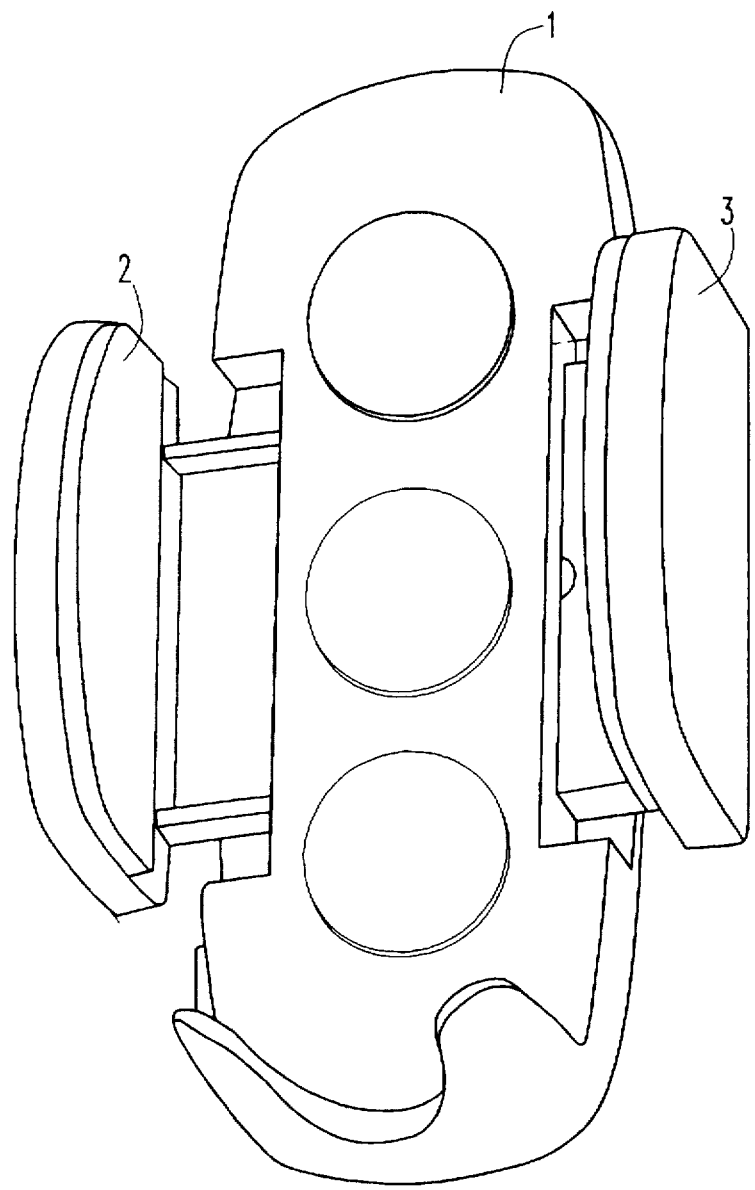
FIG. 3 is a perspective view of the support device.

The support device comprises a base body with chambers 15, 16 for the reception of coil springs 27, 28. The chambers 15, 16 have side walls of a height which is smaller in the areas 17, 18 then in other areas.

The base body further includes a release chamber 19 with a support web 20 and a coil spring 29 disposed in the release chamber.

The base body 1 also includes a support shaft 7 which extends vertically from the longitudinal center of the base body, but which is displaced slightly toward one side of the base body 1. On the support shaft 7, a pivot disc 8 is rotatably supported. At its center, the disc has a collar 13 surrounding the shaft 7. The collar is provided with a radial projection 14 serving as an engagement member. The pivot disc 8 further has two slot like holes 9,10 which extend radially and are disposed diametrically opposite one another.

A ratchet disc 6 which is shown separately in FIG. 1 and which has ratchet teeth at its circumference has a central opening 30 corresponding in shape to the collar 13. When installed, the ratchet disc 6 is placed over the pivot disc 8 and snugly receives the collar for rotation in unison with the pivot disc 8.

Between the bottom side of the base body and the pivot disc 8, there is disposed a base plate of a first clamping wall structure 2. The base plate of the clamping wall structure 2 has an elongated opening 21 through which the support shaft 7 of the base body 1 extends. The base plate of the clamping wall structure 2 has two projections 22, 23 which extend sidewardly from the base into the chambers 15, 16 of the base body 1. This is facilitated by the reduced height of the side walls in the areas 17, 18 of the chambers 15, 16. The coil springs 27, 28 in the chambers 15, 16 are disposed between the end walls of the chambers 15, 16 remote from the clamping wall structure 2 and the projections 22, 23 so that the clamping plate structure 2 is biased outwardly by the springs 22, 28 and can be moved inwardly toward the base body 1 only against the force of the springs 27, 28.

The base plate of the clamping wall structure 2 is provided with a pin 11 which is received in the slotted hole 9 of the pivot disc 8.

At the side of the pivot disc opposite the base plate of the clamping wall structure 2, the base plate of a second clamping wall structure 3 is disposed. The base plate of the clamping wall structure 3 also has an elongated opening 24 through which the collar 13 of the pivot disc 8 extends when the clamping wall structure is installed. The base plate of the clamping wall structure 3 is also provided with a pin 12 which extends into the slotted hole 10 of the pivot disc 8 so that the clamping wall structure 3 is operatively connected for movement with the pivot disc 8.

The base plates of the clamping wall structures 2, 3 are so formed that one can slide into the other, that is, the width of the base plate of the clamping wall structure 3 is somewhat smaller than the distance between the side walls 25, 26 projecting from the opposite edges of the base plate of the clamping wall structure 2 between which the base plate of the clamping wall structure 3 is received.

The clamping walls of the clamping wall structures 2, 3, between which the objects to be held are received, are preferably hollow, that is, they have spaced inner and outer side walls. The inner side wall of the clamping wall structure 2 extends downwardly only to the side walls 25 and 26 of the base plate so that an opening remains just above the base plate. In this way, the base plate of the clamping wall structure 3 can be moved partially into the space between the inner and outer side walls of the clamping wall structure 2. This permits the device to be relatively narrow while it still provides for a relatively large difference in distance between the clamping walls in their inner and outer end positions.

The pivot disc 8 is disposed between the base plates of the two clamping wall structures. The ratchet disc 6, as showm in FIG. 1, is mounted onto the collar 13 which projects through the elongated opening of the base plate of the clamping wall structure 3 for rotation with the pivot disc 8. A locking release member 4 with a latch 5 is disposed in the chamber 19 and is forced into engagement with the ratchet disc by the spring 29.

The locking release member 4 is essentially square in cross-section, but is open at the side facing the base body 1 of the device. The locking release member 4 is disposed in the release chamber 19 so as to be slideable therein. The locking release member 4 receives a coil spring 29 which engages at one end the front wall of the locking member and, at the other end, the support web 20 for biasing the locking release member outwardly and the latch 5 into engagement with the ratchet disc 6 such that the locking release member 4 can be moved inwardly against the force of the spring 29 for disengagement of the pawl 5 form the ratchet disc 6.

The locking release member 4 with its latch 5 is so arranged that the latch 5 engages the ratchet disc 6 in an area which is about in the middle between its closest points to the clamping wall of the clamping wall structure 2 and the slide body part of the locking release member 4 as shown in FIG. 1. There, upon rotation of the ratchet disc 6 in the direction of the arrow 32, the locking release member can be lifted by the teeth of the ratchet disc 6 against the force of the spring 29 permitting movement of the ratchet disc 6. Movement of the ratchet disc in the opposite direction is prevented by the pawl 5. Rotation of the ratchet disc 6 in this direction is only possible if the locking release member 4 is moved by hand inwardly against the force of the spring 29 for disengagement of the pawl 5 from the ratchet disc 6.

In its center the shaft 7 is provided with a threaded bore 31 into which a screw can be threaded by means of which the clamping wall structure 2, the pivot disc 8, the clamping wall structure 3 and the ratchet disc 6 can be held in place on the base body of the support device. The base body 1 further includes means (not shown) for mounting a bottom cover onto the base body 1.

Figure 5:
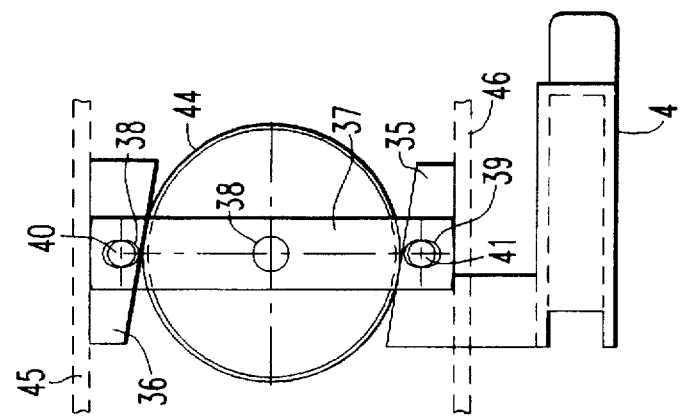
FIG. 5 shows the locking mechanism alone to facilitate the understanding of its operation.
Figure 4:
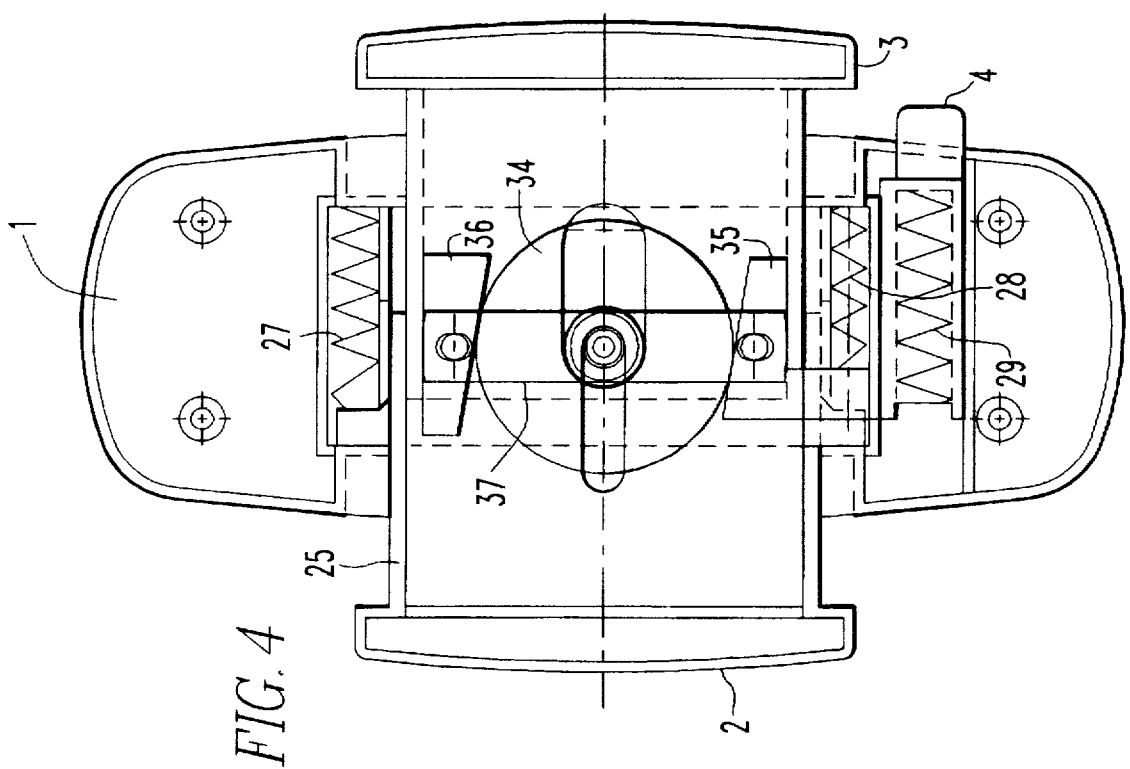
FIG. 4 is a view similar to that of FIG. 1 wherein the device is assembled and wherein the preferred locking mechanism is utilized.

The support device as shown in FIGS. 4, 5, and 6 is essentially the same as that shown in FIGS. 1, 2 and 3 except that the locking mechanism for locking the clamping walls is capable of locating the clamping structure steplessly in any position. The basic parts and operation are therefore not again described but the respective reference numerals have been inserted in those figures.

In this preferred arrangement, the locking means comprises a friction locking disc 34 which is mounted on the collar 13 of the pivot disc 8 for rotation therewith. The locking release member 4 is provided at its end adjacent the friction disc 34 with a wedge 35 which engages the locking disc to lock it in position so as to prevent outward movement of the clamping wall structures. Inward movement of the clamping wall structures against the forces of the springs 27 and 28 is possible as the wedge 35 is then moved by the locking disc out of its wedging position. The wedge can be fully disengaged from the locking disc by pushing the locking release member inwardly against the force of coil spring 29.

Preferably, a second wedge 36 is disposed diametrically opposite the first wedge 35. The second wedge is operatively connected to the first wedge by a lever arm 37 which is pivotally supported on the shaft 7. The lever arm 37 has a central opening 38 receiving the shaft 7 and, at its ends, radially elongated openings 39 and 40 receiving pins 41,42 projecting from the wedges 35 and 36, respectively. The second wedge 36 is slidingly supported by a guide wall structure 45 projecting from the back cover 43 when the back cover 43 is mounted onto the base body 1. The first wedge 35 may also be supported by a guide wall structure 46 although this is not necessary as sufficient side support may be provided by the locking release member 4.

The lever 37 transfers the movement of the wedge 35 to the wedge 36 so that the two wedges are moved into, and out of, engagement with the locking disc in unison. This arrangement provides not only for safe locking of the locking disc but, furthermore, the locking wedges are disposed opposite each other and the engagement forces are directed in opposite directions so that they are balanced and no bending forces are effective on the shaft 7.

A friction increasing coating may be applied to the circumferential surface of the locking disc 34 to improve gripping. But preferably, the locking disc is provided with a circumferential groove and a rubber O-ring 44 is disposed in that groove whereby the wedges 35 and 36 are in contact with the rubber O-ring 44.

The wedges 35 and 36 may have flat engagement surfaces or they may have angled or curved surfaces for engagement with the O-ring 44. Such angled or curved surfaces can increase friction and help in properly positioning the wedges 35 and 36 on the locking disc 34.

What is claimed is:

1. A support device for firmly supporting objects particularly for supporting a telephone in a vehicle, said device comprising:

a base body, first and second clamping wall structures extending from said base body so as to be disposed opposite one another, at least one of said clamping wall structures being slideably supported on said base body so as to be movable toward, and away from, the other of said clamping wall structures, a pivot member pivotally supported by a shaft projecting from said base body and including an engagement structure formed on one of said pivot member and said clamping wall structures and being recieved in said engagement structure for transforming linear movement of said clamping wall structure into pivot movement of said pivot member, spring means for biasing said one clamping wall structure away from the other clamping wall structure, and a locking structure operatively connected to said pivot member for locking said pivot member and, together therewith, said clamping wall structure in position, and means for releasing said locking structure to permit said springs to move said one clamping wall structure away from the other clamping wall structure.

2. The support device according to claim 1, wherein both said clamping wall structures are slideably supported on said base body so as to be movable toward, and away from, one another.

3. The support device according to claim 2, wherein said pivot member includes a pivot center and two engagement structures arranged diametrically opposite each other with respect to the pivot center of said pivot member and one of said clamping wall structures is connected with one and the other of said clamping wall structures is connected with the other of said engagement structures for concurrent movement of said clamping wall structures in opposite directions.

4. The support device according to claim 3, wherein said engagement structures comprise radially extending elongated holes formed in said pivot member and pins extending from said clamping wall structures into said elongated holes.

5. The support device according to claim 4, wherein said pivot member is a pivot disc having a center opening receiving said shaft, said pivot disc having a collar formed around said center opening and having a radial projection, said locking member being mounted on said collar for movement with said pivot disc.

6. The support device according to claim 5, wherein said locking structure comprises a ratchet disc having ratchet teeth at its circumference and said locking structure includes a pawl for locking said ratchet disc in a stepwise fashion.

7. The support device according to claim 1, wherein said shaft is disposed on said base body slightly off center with regard to a longitudinal center line of said base body toward one of said clamping wall structures and said clamping wall structures have slide bases, the slide base of said one clamping wall structure being wider than that of the other and having in its clamping wall a recess into which the front end of the slide base of the other clamping wall structure extends when said clamping wall structures are in their closest positions.

8. A support device for firmly supporting objects, particularly for supporting a telephone in a vehicle, said device comprising:

a base body, first and second clamping wall structures extending from said base body so as to be disposed opposite one another, at least one of said clamping wall structures being supported on said base body so as to be linearly movable toward, and away from, the other of said clamping wall structures, a pivot member supported on a shaft extending from said base body, means for transferring the linear motion of at least said first clamping wall structure to said pivot member, springs for biasing said first clamping wall structure away from the second clamping wall structure, a locking disc having a circumferential friction surface and being operatively connected to said pivot member for movement therewith, at least one spring-biased frictional locking member arranged adjacent the circumferential friction surface of said locking disc for locking frictional engagement therewith to prevent movement of said first clamping wall structure away from the second clamping wall structure and a release member for disengaging said frictional locking member from said locking disc to permit said springs to move said first structure away from the second clamping wall structure.

9. The support device according to claim 8, wherein both said clamping wall structures are slideably supported on said base body so as to be movable toward, and away from, one another.

10. The support device according to claim 9, wherein said pivot member has a pivot center and includes two engagement structures arranged diametrically opposite each other with respect to the pivot center of said pivot member and one of said clamping wall structures is connected with one and the other of said clamping wall structures is connected with the other of said engagement structures for concurrent movement of said clamping wall structures in opposite directions.

11. The support device according to claim 10, wherein said engagement structures comprise radially extending elongated holes formed in said pivot member and pins projecting from said clamping wall structures into said elongated holes.

12. The support device according to claim 11, wherein said pivot member is a pivot disc having a center opening receiving said shaft, said pivot disc having a collar formed around said center opening, and said locking disc being mounted on said collar for movement with said pivot disc.

13. The support device according to claim 12, wherein said frictional engagement member is a locking wedge connected to said release member for frictionally locking and releasing said locking disc in a stepless fashion.

14. The support device according to claim 13, wherein said locking disc is provided with a friction-increasing circumferential friction surface.

15. The support device according to claim 14, wherein said locking disc has a circumferential groove and an O-ring is disposed in said groove and extends around said friction disc.

16. The support device according to claim 15, wherein a lever arm with elongated holes at its opposite ends is pivotally supported on said shaft and said locking wedge associated with said locking release member has a pin extending into one of said elongated holes and another locking wedge is disposed opposite the locking wedge associated with said locking release member and also has a pin extending into said other of said elongated holes for movement of said locking wedges in opposite directions, said other locking wedge being slideably supported by a support wall of said device.

17. The support device according to claim 16, wherein a back cover is provided for said base body and said support wall extends from said back cover.

18. The support device according to claim 16, wherein id locking wedges have shaped friction surfaces for engement with said O-ring.

19. The support device according to claim 8, wherein said shaft is disposed on said base body with regard to a longitudinal center line of said base body slightly off center toward one of said clamping wall structures and said clamping wall structures have slide bases, the slide base of said one clamping wall structure being wider than that of the other and having in its clamping wall a recess into which the front end of the slide base of the other clamping wall structure extends when said clamping wall structures are in their closest positions.

* * * * *